United States Patent [19]

Matthias et al.

[11] 3,853,719

[45] Dec. 10, 1974

[54] PRODUCTION OF AQUEOUS FORMALDEHYDE SOLUTIONS OF LOW METHANOL CONTENT BY DISTILLATION WITH A BINARY SYSTEM

[75] Inventors: Guenther Matthias, Ludwigshafen; Hans Diem, Mannheim; Gunter Lehmann, Ludwigshagen, all of Germany

[73] Assignee: Badische Anilin- & Soda-Fabrik Aktiengesellschaft, Ludwigshafen/Rhein, Germany

[22] Filed: Jan. 9, 1973

[21] Appl. No.: 322,205

[30] Foreign Application Priority Data

Jan. 15, 1972   Germany............................ 2201865

[52] U.S. Cl...................... 203/56, 203/63, 260/601
[51] Int. Cl.......................... B01d 3/34, C07c 47/04
[58] Field of Search .................. 203/56, 63, 38, 17; 260/601

[56]  References Cited
UNITED STATES PATENTS

| | | | |
|---|---|---|---|
| 2,452,414 | 10/1948 | Wong.............................. | 260/606 R |
| 2,678,905 | 5/1954 | Dice............................... | 260/606 R |
| 2,690,994 | 10/1954 | McCants............................ | 260/606 |
| 3,558,719 | 1/1971 | Cier ................................ | 260/606 R |

Primary Examiner—Wilbur L. Bascomb, Jr.
Attorney, Agent, or Firm—Johnston, Keil, Thompson & Shurtleff

[57]  ABSTRACT

The production of a formaldehyde solution having a low content of methanol by distilling aqueous formaldehyde solution containing methanol in the presence of a mixture of at least one alkanol of more than seven carbon atoms and at least one dialkyl ether of more than seven carbon atoms per alkyl group.

12 Claims, No Drawings

PRODUCTION OF AQUEOUS FORMALDEHYDE SOLUTIONS OF LOW METHANOL CONTENT BY DISTILLATION WITH A BINARY SYSTEM

The invention relates to a process for the production of aqueous formaldehyde solutions of low methanol content by distillation of solutions containing methanol in the presence of a mixture of alkanols and dialkyl ethers each having more than seven carbon atoms per alkyl group.

It is known from Walker, Formaldehyde (3rd edition, Reinhold Publishing Corporation N.Y. 1964) pages 136 and 137 that the bulk of the methanol can be removed from aqueous formaldehyde solutions containing methanol by distillation. The end product (formaldehyde solution having a low methanol content) is withdrawn from the bottoms. When such distillations are carried out on an industrial scale, where amounts of from 20 to 2,000 kg of methanol per hour is separated generally from formaldehyde solutions containing from 1.0 to 20 percent by weight of methanol, in rectification columns, retardations occur in the speed of distillation. These retardations (accumulation of rectification condensate in the column) become evident not only in a decrease in amount of discharge from the bottoms per unit of time but also in an increase in the pressure after a certain distillation period. For example at the abovementioned distillation speeds the pressure in the bottoms of a rectification column may rise from the usual 1.2 atmospheres to from 1.4 to 4 atmospheres after one hour to sixteen hours, often even at intervals of from one hour to three hours. At the same time the amount of bottoms discharge decreases to 90 percent of the amount to be expected theoretically based on the amount of formaldehyde fed in. In continuous operation an equilibrium is set up between the feed of crude solution and the separation of methanol distillate and formaldehyde solution of low methanol content. This equilibrium is disturbed by the said difficulties, more liquid is fed in than is withdrawn, the column retains some of the liquid (damming). In these cases an increase in the column of liquid in the outlet from the individual trays of a column is observed; if the capacity of the outlet is exceeded by this increase, flooding of the tray takes place. The layer of liquid on the trays increases. In a bubble tray column the liquid loading increases and the phenomenon of the liquid raining through the chimneys takes place. Moreover large amounts of foam may form in the condensate liquid. The efficiency of the trays is impaired.

All these difficulties usually result in considerable disturbance in operation or breakdown. At least interruptions in operation are necessary as regards the feed and the supply of heat. In certain cases these disturbances may be minimized by appropriate construction of the columns (Hoppe/Mittelstrass, Grundlagen der Dimensionierung von Kolonnenboeden (Steinkopff, Dresden 1967) pages 45 et seq.). Nevertheless even in the case of columns previously adapted for such distillations disturbances of the said type occur in prolonged operation the causes of which are unknown and not to be sought solely in the construction of the column. In many cases the rectification has to be carried out in columns which have been designed also or only for the rectification of other substances, in which case the difficulties described occur to an increased extent.

The object of this invention is a novel process for preparing aqueous formaldehyde solutions having a methanol content of less than 1.25 percent by weight based on formaldehyde (calculated as 100 percent) in better space-time yields by a simpler and more economical method.

We have now found that aqueous formaldehyde solutions having a low content of methanol are advantageously obtained by distillation by carrying out the distillation of an aqueous formaldehyde solution containing methanol in the presence of a mixture of at least one alkanol of more than seven carbon atoms and at least one dialkyl ether each of whose two alkyl groups contains more than seven carbon atoms.

Having regard to the prior art it is surprising that the process of the invention gives by a simpler and more economical method a low-methanol formaldehyde solution having a methanol content of less than 1.25 percent by weight based on formaldehyde (calculated as 100 percent) in better space-time yields. The difficulties and resultant operational disturbances described above are avoided. The throughput of formaldehyde solution per unit of time in such distillations and consequently the speed of continuous distillation is as a rule from 1.5 times to twice the conventional disturbed operation.

From 28 to 65 percent, preferably from 36 to 55 percent, by weight formaldehyde solutions are as a rule used as the aqueous formaldehyde solutions containing methanol. These solutions may be prepared by prior art methods by oxidizing dehydrogenation of methanol in the presence of a silver catalyst or of metal oxides, for example oxides of iron, molybdenum, chromium, cobalt, tungsten, aluminum or nickel, with the optional use of carrier materials such as silicates; other methods, for example the partial oxidation of hydrocarbons such as methane may also be used. Ullmanns Encyklopaedie der technischen Chemie, volume 7, pages 659 et seq. may be referred to for details of the methods. The reaction gas leaving the catalyst zone is cooled and then advantageously fed to an absorption tower in which the formaldehyde is washed from the gas mixture with water, advantageously countercurrent. The solutions thus obtained may contain from 1 to 20 percent by weight, advantageously 1 to 3 percent by weight of methanol, from 0.007 to 0.2 percent by weight of formic acid, from 0.001 to 0.5 percent by weight of impurities and byproducts in the form of aldehydes such as acrolein, glyoxal, propionaldehyde and acetaldehyde; ketones such as acetone and butanone-2; glycol and higher alkanols such as isobutanol, isopropanol, n-propanol, isohexanol and isoheptanol; ethers such as dimethyl ether; other organic compounds, for example esters as for example dimethyl terephthalate; amides such as monomethylformamide and dimethylformamide; trimethylammonium formate based on formaldehyde calculated as 100 percent. The process used generally determines which of the said impurities and how much of them is present in the formaldehyde solution.

The distillation is carried out as a rule at a temperature of from 98° to 106°C in the bottoms and preferably of 102° to 104°C at atmospheric pressure or superatmospheric pressure, advantageously at a pressure of from 1.1 to 1.3 atmospheres in the bottoms, batchwise of continuously. A solvent mixture of at least one alkanol of more than seven carbon atoms, preferably from 8 to 24 and particularly from 8 to 12 carbon atoms and at least one dialkyl ether in which each of the two alkyl groups contains more than seven, preferably from 8 to 24 and particularly from 8 to 12 carbon atoms is added to the solution. The dialkyl ethers may contain alkyl groups which are different from one another and/or from the alkyl groups of the alkanols. The alkyl groups may be branched or advantageously linear. From 0.00001 to 0.0015 percent, preferably from 0.00005 to 0.0010 percent, by weight of solvent mixture based on formaldehyde (calculated as 100 percent) is generally used. In batchwise operation from 1 to 150 g, preferably from 5 to 100 g of solvent mixture per 1,000 kg of formaldehyde (calculated as 100 percent) per hour is generally used. Mixtures of one to five alkanols and of one to five dialkyl ethers are advantageously suitable and the number of alkanol components is advantageously greater than the number of dialkyl ether components. Total amounts of from 50 to 900 percent, advantageously from 100 to 400 percent, by weight of alkanols based on the total amount of ethers are advantageous.

Mixtures of two to five alkanols and one to three dialkyl ethers whose two alkyl groups and the alkyl group of an alkanol present are identical are preferred. Examples of suitable alkanols and ethers are octyl, nonyl, decyl, undecyl, lauryl, tridecyl, myristyl, pentadecyl, cetyl, heptadecyl, stearyl, nonadecyl, araclyl, heneicosyl and behenyl alcohol and the corresponding ethers. Such mixtures occur for example in the distillation of fatty alcohols prepared by various methods (Ullmann, loc. cit., volume 7, pages 440 et seq.), advantageously according to an oxo process. Fractions of such fatty alcohol distillations having a boiling point at 760 torr of from 80° to 280°C, preferably from 145° to 250°C and particularly from 150° to 210°C are particularly advantageous. These fatty alcohol fractions which are known under the names thick oil and heavy ends generally have refractive indexes $n_D^{20}$ of from 1.425 to 1.451 and densities $d_4^{20}$ of from 0.76 to 0.79. The mixtures advantageously have saponification numbers of less than 20 and acid numbers of less than 1. Unsaturated fatty alcohols or corresponding ethers may if desired be present; the iodine value of the mixtures is advantageously less than 2. The abovementioned fatty alcohol fractions (heavy ends) are generally used in an amount of from 0.00001 to 0.0015 percent, preferably from 0.0001 to 0.0010 percent and particularly from 0.00005 to 0.0010 percent, by weight based on formaldehyde (calculated as 100 percent). The heavy ends may contain admixtures of up to 5 percent by weight of esters, for example nonyl acetate, and up to 0.5 percent by weight of water.

The distillation may be carried out as follows: an aqueous formaldehyde solution containing methanol to which the abovementioned solvent mixture, particularly heavy ends, has been added is distilled at the distillation temperature in a rectification column, for example in a sieve plate, Oldershaw, glass tray, bubble tray or valve plate column, packed column or column with rotating inserts. It is advantageous to use tray columns which permit a speed of from 0.030 to 0.2 part by volume per hour of crude formaldehyde solution entering the column per part by volume of the total volume of the column. In bubble tray columns the ratio of weir height to diameter is from 0.2:1 to 0.4:1, in ball valve tray columns and sieve plate columns orifice diameters of from 5 to 15 mm, ball diameters of from 8 to 30 mm and tray spacings of 300 to 800 mm are preferred. Distillation times of from 5 to 2,000 kg of methanol in the distillate per hour and/or feed speeds of 1,000 to 10,000 kg of formaldehyde solution having a content of from 0.5 to 20 percent by weight of methanol based on formaldehyde (calculated as 100 percent) are advantageous.

In continuous operation the formaldehyde solution containing methanol may be fed into the distillation bottoms or advantageously into the middle third of the column. In the case of tray columns, for example with 70 trays, a feed between the 27th and 49th tray is advantageous. The solvent mixture (heavy ends) may be fed in together with the formaldehyde solution or separately therefrom; a separate feed may be at any position in the column, for example also in the top of the column and it is advantageously above, for example one tray to two trays above the point of entry of the formaldehyde solution. The solvent mixture may be fed in intermittently or continuously. In batchwise dosing it is usually adequate to feed in at intervals of from 10 to 50 hours the amount corresponding to the period in question. In the case of heavy ends and having regard to the small amount and the high viscosity thereof it is advantageous to prepare previously a solution in a suitable solvent, for example methanol, or a suspension in a formaldehyde solution. Examples of solubilities of heavy ends are given in the following table:

| Solvent | Solubility (g heavy ends in 100 g of solvent) |
|---|---|
| methanol | unlimited miscibility |
| 60% by weight methanol<br>40% by weight water | 0.5 |
| 40.2% by weight formaldehyde<br>58.4% by weight water<br>1.4% by weight methanol | 1.0 |

The bottoms may if desired be returned to the rectification above the uppermost tray in the column.

Aqueous formaldehyde solution of low methanol content which can be prepared according to the process of the invention is a disinfectant, tanning agent, reducing agent and valuable starting material for the production of synthetic resins, adhesives and plastics. The said volume of Ullmann, page 670, may be referred to for details of the uses of formaldehyde.

The following examples illustrate the invention. The parts given in the following examples are by weight.

EXAMPLE 1

3,100 parts per hour of a mixture of 40.5 percent by weight of formaldehyde, 1.4 percent by weight of methanol, 0.1 percent by weight of byproducts and 58 percent by weight of water is supplied to a distillation column having 65 bubble trays and a liquid capacity of 1,500 parts for the separation of methanol from mixtures of formaldehyde and water containing methanol at 103°C in the bottoms. The feed is introduced at the 38th tray counting from the bottom. 35 parts per hour of a mixture of 99 percent by weight of methanol and 1 percent of formaldehyde is withdrawn at the head and 3,065 parts per hour of a mixture of 41.0 percent by weight of formaldehyde, 0.24 percent by weight of methanol, 0.06 percent by weight of byproducts and 58.7 percent by weight of water is withdrawn from the bottoms. The pressure in the bottoms is 1.2 atmospheres and the pressure at the 45th tray of the column is 1.1 atmosphere. After 10 hours the pressure in the bottoms rises above 1.4 atmospheres, the bottoms discharge decreases to 2,200 parts; the column dams and retains liquid. Then 0.015 part of heavy ends consisting of 50 percent by weight of nonyl alcohol, 5 percent by weight of octyl alcohol, 5 percent by weight of lauryl alcohol and 20 percent by weight of dinonyl ether, 18 percent by weight of dioctyl ether, 0.2 percent by weight of water, 1.8 percent by weight of nonyl acetate dissolved in 0.2 part of methanol is fed within one minute onto the 38th tray together with the feed. Twelve minutes later the pressure begins to fall and reaches 1.2 atmospheres again after 13 minutes, the bottoms discharge increases after a short time to 4,500 parts per hour and and after 30 minutes ia again 3,065 parts per hour. There is no further disturbance in the distillation even after 2 days.

EXAMPLE 2

In a distillation analogous to that in Example 1 the heavy ends feed takes place separately from the formaldehyde solution on the 65th tray, i.e. at the head of the column. The results are as in Example 1.

We claim:

1. A process for the production of aqueous formaldehyde solutions having a low content of methanol by distillation which comprises distilling an aqueous solution of formaldehyde containing methanol in a distillation column in the presence in said column of (a) at least one alkanol of more than seven carbon atoms and (b) at least one dialkyl ether in which each of the two alkyl groups contains more than seven carbon atoms, withdrawing as the overhead distillate fraction a methanol-rich distillate, and withdrawing as the bottoms distillate fraction aqueous formaldehyde solution having low methanol content.

2. A process as claimed in claim 1 wherein said aqueous solution of formaldehyde containing said methanol initially contains from 36 to 55 percent by weight of formaldehyde.

3. A process as claimed in claim 1 wherein the distillation is carried out at a temperature in the bottoms of from 98° to 106°C.

4. A process as claimed in claim 1 wherein the distillation is carried out in the presence in said column of at least one alkanol of 8 to 24 carbon atoms and at least one dialkyl ether in which each of the two alkyl groups contains from 8 to 24 carbon atoms.

5. A process as claimed in claim 1 wherein the distillation is carried out in the presence in said column of at least one alkanol of 8 to 12 carbon atoms and at least one dialkyl ether in which each of the two alkyl groups contains from 8 to 12 carbon atoms.

6. A process as claimed in claim 1 wherein the distillation is carried out in the presence in said column of from 0.00001 to 0.0015 percent by weight of (a) and (b), based on the formaldehyde, calculated as 100 percent.

7. A process as claimed in claim 1 wherein the distillation is carried out in the presence in said column of from 0.00005 to 0.0010 percent by weight of (a) and (b), based on the formaldehyde, calculated as 100 percent.

8. A process as claimed in claim 6 wherein the distillation is carried out in the presence in said column of a total amount of from 50 to 900 percent by weight of said alkanols (a) based on the total amount of said ethers (b), the alkanols (a) being mixture of two to five alkanols with 8–24 carbon atoms in each alkyl group.

9. A process as claimed in claim 8 wherein said alkanols (a) and ethers (b) are derived as the heavy ends fraction from a fatty alcohol distillation and having a boiling point at 760 torr of from 80° to 280°C.

10. A process as claimed in claim 9. said heavy ends fraction having a boiling point of from 145° to 250°C at 760 torr.

11. A process as claimed in claim 9 wherein the distillation is carried out in the presence of said heavy ends fraction in an amount of from 0.00001 to 0.0015 percent by weight based on said formaldehyde, calculated as 100 percent.

12. A process as claimed in claim 1 wherein the distillation is carried out in the presence in said column of a total amount of from 50 to 900 percent by weight of said alkanols (a) based on the total amount of said ethers (b), the alkanols (a) being mixture of two to five alkanols with 8–24 carbon atoms and the ethers (b) being one to three dialkyl ethers with 8–24 carbon atoms in each alkyl group.

* * * * *

UNITED STATES PATENT AND TRADEMARK OFFICE
CERTIFICATE OF CORRECTION

PATENT NO. : 3,853,719
DATED : December 10, 1974
INVENTOR(S) : Guenther Matthias, H. Diem, and G. Lehmann It is certified that error appears in the above-identified patent and that said Letters Patent are hereby corrected as shown below:

Column 1, line 58, delete "Kolonnenboeden" and substitute --Kolonnenböden--.

Column 2, line 37, delete "Encyklopaedic" and substitute --Encyclopädie--.

Column 3, line 39, delete "densities $^{20}_{4}$..." and substitute --densities $d^{20}_{4}$...--.

Column 6, line 24, delete "(a) being mixture of 2 to alkanols with 8-24 carbon atoms in each alkyl group." and substitute --(a) being mixture of 2 to 5 alkonals with 8-24 carbon atoms and the ethers (b) being 1 to 3 dialkyl ethers with 8-24 carbon atoms in each alkyl group.--.

Column 6, line 30, delete "9." and substitute --9,--.

Signed and Sealed this twentieth Day of January 1976

[SEAL]

Attest:

RUTH C. MASON
Attesting Officer

C. MARSHALL DANN
Commissioner of Patents and Trademarks